(12) United States Patent
Su et al.

(10) Patent No.: US 10,571,895 B2
(45) Date of Patent: Feb. 25, 2020

(54) THREE-DIMENSIONAL PRINTING APPARATUS AND THREE-DIMENSIONAL PRINTING METHOD

(71) Applicants: XYZprinting, Inc., New Taipei (TW); Kinpo Electronics, Inc., New Taipei (TW)

(72) Inventors: Ching-Hua Su, New Taipei (TW); Ting-Yu Lu, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 143 days.

(21) Appl. No.: 15/687,552

(22) Filed: Aug. 28, 2017

(65) Prior Publication Data
US 2019/0011902 A1    Jan. 10, 2019

(30) Foreign Application Priority Data
Jul. 7, 2017 (CN) .......................... 2017 1 0550030

(51) Int. Cl.
*G05B 19/40* (2006.01)
*G05B 19/4099* (2006.01)
(Continued)

(52) U.S. Cl.
CPC ........ *G05B 19/4099* (2013.01); *B29C 64/393* (2017.08); *B33Y 30/00* (2014.12);
(Continued)

(58) Field of Classification Search
None
See application file for complete search history.

(56) References Cited

U.S. PATENT DOCUMENTS

| 2011/0205583 A1* | 8/2011 | Young | G06T 19/20 |
| | | | 358/1.15 |
| 2016/0016360 A1* | 1/2016 | Voris | D01F 6/28 |
| | | | 264/129 |

(Continued)

OTHER PUBLICATIONS

Neri Volpato, et al., "Identifying the directions of a set of 2D contours for additive manufacturing process planning," The International Journal of Advanced Manufacturing Technology, vol. 68, Jan. 2013, pp. 33-43.

(Continued)

*Primary Examiner* — Jason Lin
(74) *Attorney, Agent, or Firm* — JCIPRNET

(57) ABSTRACT

A 3D printing method adapted to a 3D printing apparatus is provided. The 3D printing apparatus is configured to edit a plurality of sliced images, and execute a 3D printing operation according to the edited sliced images. The 3D printing method includes: analyzing a plurality of sliced objects of the sliced images, so as to draw a plurality of sliced object casings according to individual contours of the sliced objects, where the sliced object casings respectively include a part of the sliced objects; and respectively deleting the other parts of the sliced objects outside the sliced object casings, and integrating the sliced object casings of the sliced images to obtain a 3D model casing. Moreover, the 3D printing apparatus applying the 3D printing method is also provided.

12 Claims, 5 Drawing Sheets

(51) Int. Cl.
*G06T 7/00* (2017.01)
*G06T 19/20* (2011.01)
*B29C 64/393* (2017.01)
*B33Y 50/02* (2015.01)
*B33Y 30/00* (2015.01)
B29C 64/386 (2017.01)
B33Y 50/00 (2015.01)

(52) U.S. Cl.
CPC ............ *B33Y 50/02* (2014.12); *G06T 7/0006* (2013.01); *G06T 19/20* (2013.01); *B29C 64/386* (2017.08); *B33Y 50/00* (2014.12); *G05B 2219/49023* (2013.01); *G06T 2200/04* (2013.01); *G06T 2200/08* (2013.01); *G06T 2219/2008* (2013.01); *G06T 2219/2021* (2013.01)

(56) References Cited

U.S. PATENT DOCUMENTS

| 2016/0059485 | A1* | 3/2016 | Ding | B33Y 10/00 264/401 |
| 2016/0288426 | A1* | 10/2016 | Yoshida | G05B 19/4099 |
| 2017/0036395 | A1* | 2/2017 | Sanz | B29C 70/70 |
| 2017/0038765 | A1 | 2/2017 | Yoshida | |
| 2018/0196407 | A1* | 7/2018 | Lee | B29C 64/112 |
| 2018/0229448 | A1* | 8/2018 | Bastian | B33Y 10/00 |

OTHER PUBLICATIONS

"Search Report of Europe Counterpart Application", dated May 22, 2018, p. 1-p. 9.

\* cited by examiner

THREE-DIMENSIONAL PRINTING APPARATUS AND THREE-DIMENSIONAL PRINTING METHOD

CROSS-REFERENCE TO RELATED APPLICATION

This application claims the priority benefit of China application serial no. 201710550030.3, filed on Jul. 7, 2017. The entirety of the above-mentioned patent application is hereby incorporated by reference herein and made a part of this specification.

BACKGROUND OF THE INVENTION

Field of the Invention

The invention relates to a three-dimensional (3D) printing technique, and particularly relates to a 3D printing apparatus and a 3D printing method.

Description of Related Art

Along with progress of computer-aided manufacturing (CAM), manufacturing industry has developed a three-dimensional (3D) printing technology, by which an original design conception can be quickly manufactured. The 3D printing technology is actually a general designation of a series of rapid prototyping (RP) techniques, and a basic principle thereof is additive manufacturing on a printing platform, where a RP machine is used to form multiple layers of sliced objects in an X-Y plane on the printing platform through scanning, so as to stack the sliced objects to form a 3D object.

The present 3D printing technique has been attempted to be used in special applications for printing, for example, aircraft components or human bones. However, a conventional method for hollowing a 3D model is to determine a hollowable region or a non-hollowable region of the 3D model by determining a configuration relationship of a plurality of triangular meshes of the 3D model. However, the conventional hollowing method may result in a fact that an inner 3D contour of a casing of the 3D model has an unsmooth surface, and a thickness of the casing cannot be accurately adjusted. Therefore, how to print a 3D object with a hollowed structure is one of the most important issues in the field.

SUMMARY OF THE INVENTION

The invention is directed to a 3D printing apparatus and a 3D printing method, which are adapted to obtain a smooth 3D model casing, and execute a printing operation on the 3D model casing, so as to print a 3D object with a high quality hollowed structure.

The invention provides a 3D printing method adapted to a 3D printing apparatus. The 3D printing apparatus is configured to horizontally slice a 3D model to obtain a plurality of sliced images, and edit the sliced images to execute a 3D printing operation according to the edited sliced images. The 3D printing method includes: analyzing a plurality of sliced objects of the sliced images, so as to draw a plurality of sliced object casings according to individual contours of the sliced objects, where the sliced object casings respectively include a part of the sliced objects; and respectively deleting the other parts of the sliced objects outside the sliced object casings, and integrating the sliced object casings of the sliced images to obtain a 3D model casing.

In an embodiment of the invention, the sliced object casings respectively have a same predetermined thickness.

In an embodiment of the invention, the 3D printing method further includes: analyzing an outer 3D contour of the 3D model casing to obtain a plurality of slicing numbers corresponding to a plurality of coordinate positions of the outer 3D contour on a reference plane; and determining a distance of the 3D model casing from the outer 3D contour to an inner 3D contour in a vertical direction based on the slicing numbers corresponding to the coordinate positions, and respectively modifying the sliced object casings of the sliced images.

In an embodiment of the invention, the step of determining the distance of the 3D model casing from the outer 3D contour to the inner 3D contour in the vertical direction based on the slicing numbers corresponding to the coordinate positions includes determining a printing region of the 3D model casing according to a predetermined layer number, so as to modify the inner 3D contour of the 3D model casing.

In an embodiment of the invention, the step of analyzing the sliced objects of the sliced images, so as to draw the sliced object casings according to the individual contours of the sliced objects includes: respectively drawing a plurality of reference contours along an outer side of each of the individual contours of the sliced objects; and respectively drawing the sliced object casings along an inner side of each of the reference contours.

In an embodiment of the invention, the contour is an outer layer contour or a hole contour.

In an embodiment of the invention, the 3D printing method further includes: respectively drawing a support structure in regions encircled by the sliced object casings.

The invention provides a 3D printing apparatus including a 3D printing device, a processing device and a storage device. The processing device is coupled to the 3D printing device. The processing device is configured to horizontally slice a 3D model to obtain a plurality of sliced images, and edit the sliced images. The processing device operates the 3D printing device to execute a 3D printing operation according to the edited sliced images. The storage device is coupled to the processing device. The storage device is configured to store the 3D model and a plurality of modules. The processing device executes the modules to perform operations of: analyzing a plurality of sliced objects of the sliced images, so as to draw a plurality of sliced object casings according to individual contours of the sliced objects, where the sliced object casings respectively include a part of the sliced objects; and respectively deleting the other parts of the sliced objects outside the sliced object casings, and integrating the sliced object casings of the sliced images to obtain a 3D model casing.

In an embodiment of the invention, the sliced object casings respectively have a same predetermined thickness.

In an embodiment of the invention, the processing device executes the modules to perform operations of: analyzing an outer 3D contour of the 3D model casing to obtain a plurality of slicing numbers corresponding to a plurality of coordinate positions of the outer 3D contour on a reference plane; and determining a distance of the 3D model casing from the outer 3D contour to an inner 3D contour in a vertical direction based on the slicing numbers corresponding to the coordinate positions, and respectively modifying the sliced object casings of the sliced images.

In an embodiment of the invention, the operation of determining the distance of the 3D model casing from the outer 3D contour to the inner 3D contour in the vertical direction based on the slicing numbers corresponding to the coordinate positions includes determining a printing region of the 3D model casing according to a predetermined layer number, so as to modify the inner 3D contour of the 3D model casing.

In an embodiment of the invention, the operation of analyzing the sliced objects of the sliced images, so as to draw the sliced object casings according to the individual contours of the sliced objects includes: respectively drawing a plurality of reference contours along an outer side of each of the individual contours of the sliced objects; and respectively drawing the sliced object casings along an inner side of each of the reference contours.

In an embodiment of the invention, the contour is an outer layer contour or a hole contour.

In an embodiment of the invention, the processing device executes the modules to perform operations of: respectively drawing a support structure in regions encircled by the sliced object casings.

According to the above descriptions, the 3D printing apparatus and the 3D printing method of the invention are adapted to smoothly hollow the 3D model to obtain the 3D model casing, and respectively modify a thickness of the 3D model casing along a horizontal direction and a vertical direction, so as to effectively mitigate unevenness of the inner 3D contour of the 3D model. Therefore, the 3D printing apparatus and the 3D printing method of the invention are adapted to print a 3D object with a high quality hollowing effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
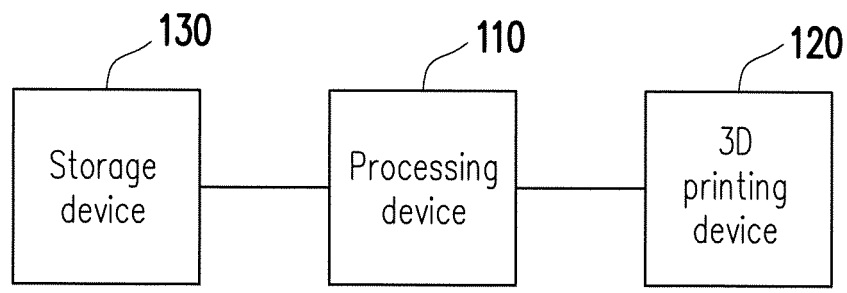
FIG. 1 is a schematic diagram of a three-dimensional (3D) printing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a three-dimensional (3D) printing apparatus according to an embodiment of the invention. Referring to FIG. 1, the 3D printing apparatus 100 includes a processing device 110, a 3D printing device 120 and a storage device 130. The processing device 110 is coupled to the 3D printing device 120 and the storage device 130. In the present embodiment, the processing device 110 is configured to control the 3D printing device 120 to execute a 3D printing operation. In the present embodiment, the 3D printing device 120 may include a printing head, a printing platform and a driving device, etc. For example, the printing head melts a forming material, and feeds the melted forming material on the printing platform, so as to implement the 3D printing operation. Moreover, the 3D printing device 120 may further include other components (for example, a controller, a heating module, a material supplying pipe, a linkage mechanism of the printing head, etc.) used in collaboration with the printing head, the printing platform and the driving device to implement the 3D printing operation, and enough instructions and recommendations for the related components may be learned from ordinary knowledge of the field, and detailed description thereof is not repeated.

In the present embodiment, the processing device 110 may include a processing chip, an image processing chip, or a central processing unit (CPU), or other general purpose or special purpose microprocessor, a digital signal processor (DSP), a programmable controller, an application specific integrated circuits (ASIC), a programmable logic device (PLD), or other similar processing circuit or a combination of the above devices.

In the present embodiment, the 3D printing operation refers to that the 3D printing device 120 controls a moving path of the printing head according to a plurality of sliced images of a 3D model, and controls the printing head to print sliced objects on a carrying surface of the printing platform, where the sliced images may be two-dimensional (2D) image files. In the present embodiment, the 3D printing device 120 sequentially prints multiple layers of the sliced objects and stacks the sliced objects to form a 3D object on the carrying surface of the printing platform. In the present embodiment, the processing device 110 may read a 3D image file to present a 3D model in an edit interface. Moreover, the 3D model is, for example, constructed by a computer host through computer-aided design (CAD) or animation modeling software, etc.

In the present embodiment, the storage device 130 is, for example, a dynamic random access memory (DRAM), a flash memory or a non-volatile random access memory (NVRAM), etc. The storage device 130 is configured to store modules and data of the embodiments of the invention, such that the processing device 110 may read or execute the modules and data to implement a model editing operation or 3D printing operation, etc. of the embodiments of the invention. Moreover, the modules of the embodiments of the invention may be implemented in a software form or a hardware circuit form, which is not limited by the invention.

Figure 2:
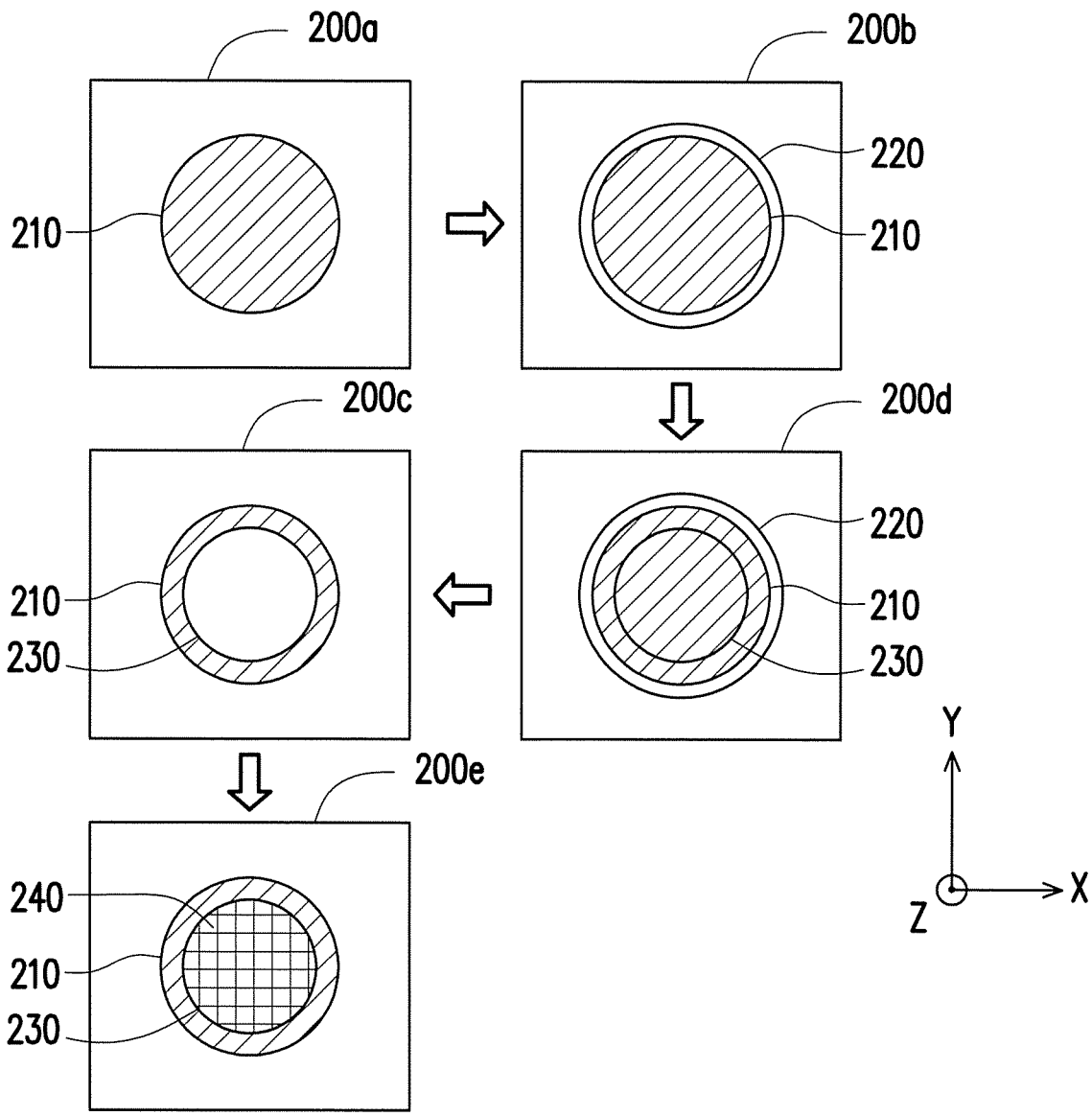
FIG. 2 is a schematic diagram of editing sliced images according to an embodiment of the invention.

FIG. 2 is a schematic diagram of editing sliced images according to an embodiment of the invention. Referring to FIG. 1 and FIG. 2, in the present embodiment, the processing device 110 is configured to horizontally slice a 3D model to obtain a plurality of sliced images, and edit the sliced images. Taking one sliced image as an example, in the present embodiment, the processing device 110 may analyze a sliced object of an initial sliced image 200a, and draw a sliced object casing according to a contour 210 of the sliced object. A region encircled by the contour 210 is the sliced object (an oblique line region). In detail, first, the processing device 110 may draw a reference contour 220 along an outer side of the contour 210 of the sliced object 210. As shown by a sliced image 200b, a region encircled by the contour 210 and the reference contour 220 is a reference region. Then, the processing device 110 draws another reference contour 230 along an inner side of the reference region. As shown by the sliced image 200c, the processing device 110 sets a region encircled by the contour 210 and the reference contour 230 as the sliced object casing, where the sliced object casing includes a part of the sliced object. Then, the processing device 110 deletes the other part of the sliced object outside the sliced object casing. As shown by a sliced image 200d, the sliced object casing may have an equidistant wall thickness. Namely, the 3D printing apparatus 100 of the present embodiment may obtain a smooth sliced object casing. It should be noted that the aforementioned outer side and the inner side of the present embodiment are relative to the sliced object. In the present embodiment, the inner side refers to one side including a main body of the sliced object, and the outer side refers to another side not including the main body of the sliced object.

Moreover, in an embodiment, the processing device 100 further edits the sliced object casing. As shown by a sliced image 200e, the processing device 100 may draw a support structure 240 in the region encircled by the sliced object casing, such that the 3D object printed by the 3D printing device 120 may have enough support and a good degree of solidity. However, the support structure 240 of the invention is not limited to a structure shape shown by the sliced image 200e of FIG. 2, and the support structure 240 may be determined according to different printing requirements or types of the 3D object, which is not limited by the invention. Moreover, the sliced images 200a-200e of the present embodiment are only used for describing an edit process of the sliced images, and the shapes of the sliced objects of the invention are not limited to the shapes shown in the sliced images 200a-200e of FIG. 2.

Figure 3:
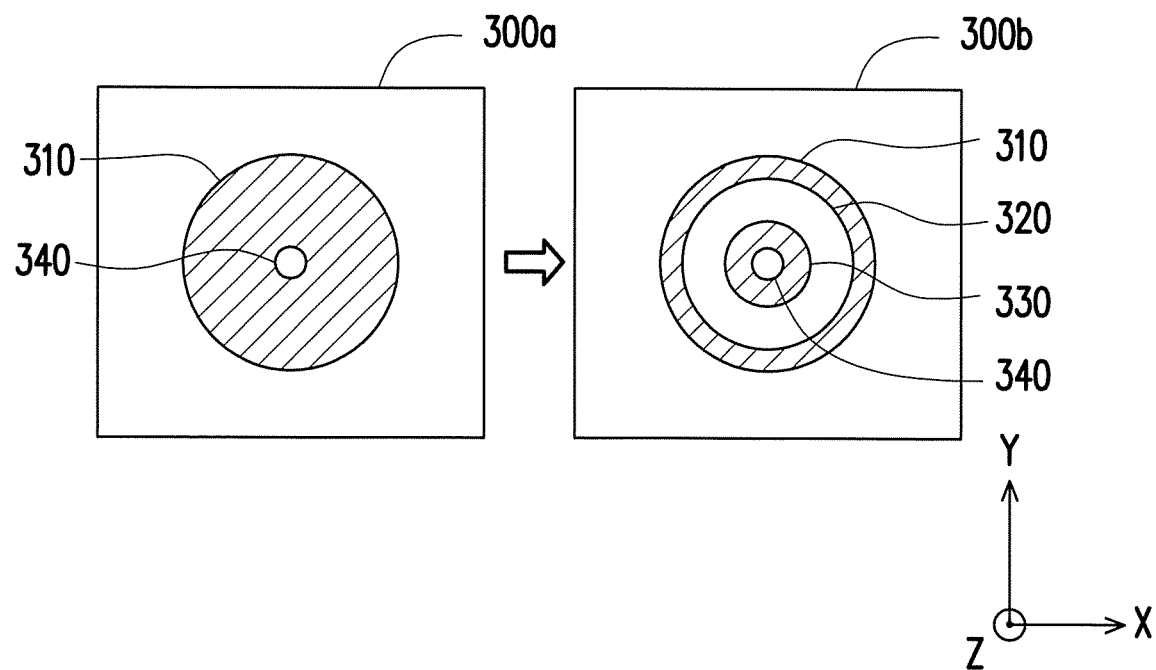
FIG. 3 is a schematic diagram of editing sliced images according to another embodiment of the invention.

FIG. 3 is a schematic diagram of editing sliced images according to another embodiment of the invention. Referring to FIG. 1 and FIG. 3, in the present embodiment, a sliced object of an initial sliced image 300a may have to 2 contours. As shown by the sliced image 300a, the sliced object is a region encircled by a contour 310 and a contour 330. In the present embodiment, the contour 310 is an outer contour of the sliced object, and the contour 330 is a hole contour of the sliced object. In the present embodiment, the processing 110 may execute the aforementioned edit method of the embodiment of FIG. 2 on the sliced object having the outer contour and the hole contour to obtain a reference contour 320 and a reference contour 340. As shown by a sliced image 300b, the processing device 110 may set a region encircled by the contour 310 and the reference contour 320 as a sliced object casing, and set a region encircled by the contour 330 and the reference contour 340 as another sliced object casing. Moreover, the processing device 110 of the present embodiment may also draw the support structure in the region encircled by the two sliced object casings (for example, the region between the reference contour 320 and the contour 330), such that the 3D object printed by the 3D printing device 120 may have enough support and a good degree of solidity.

However, those skilled in the art may learn enough instructions and recommendations for the analyzing method of the sliced objects and the edit method of the sliced images of the present embodiment from the descriptions of the embodiment of FIG. 2, and detailed description thereof is not repeated.

Figure 4:
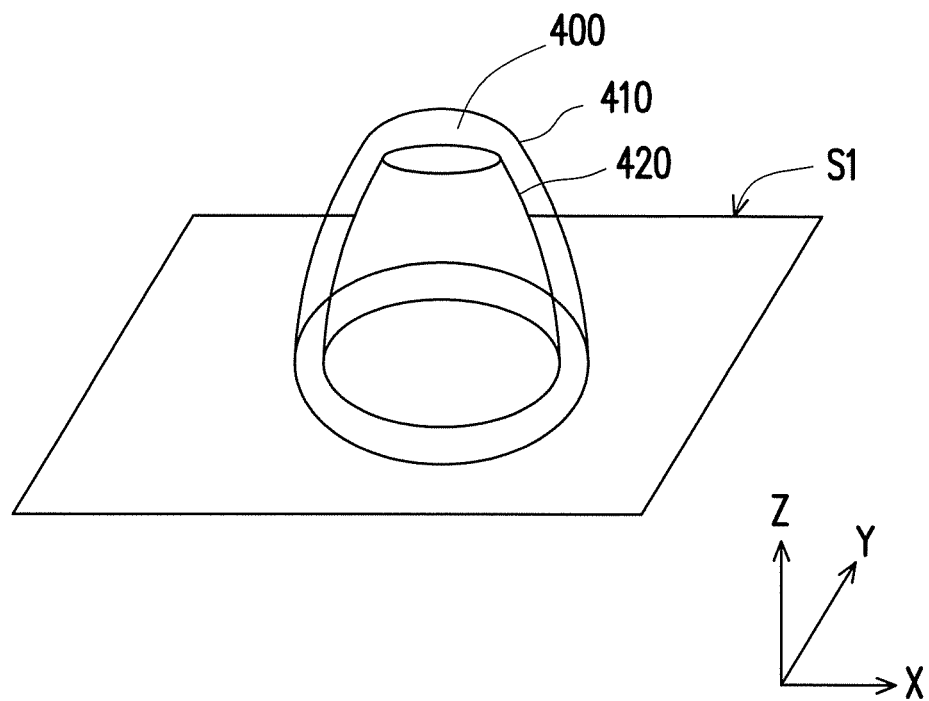
FIG. 4 is a schematic diagram of a 3D model according to an embodiment of the invention.

FIG. 4 is a schematic diagram of a 3D model according to an embodiment of the invention. Referring to FIG. 1 and FIG. 4, in the present embodiment, the processing device 110 may integrate a plurality of sliced images having the sliced object casings drawn according to the embodiment of FIG. 2 to obtain a 3D model casing 400. In the present embodiment, the 3D model casing 400 is, for example, located in a 3D space formed by a coordinate axis X, a coordinate axis Y and a coordinate axis Z. Moreover, the 3D model casing 400 may be formed by stacking a plurality of sliced object casings of a plurality of sliced images from a reference plane S1 along the coordinate axis Z. The reference plane S1 is a plane formed by the coordinate axis X and the coordinate axis Y, and the reference plane S1 is, for example, a carrying surface of the printing platform. The 3D model casing 400 may include an outer 3D contour 410 and an inner 3D contour 420. In the present embodiment, the processing device 110 may modify a wall thickness of the 3D model casing 400 in a vertical direction, which is described below with reference of FIG. 5-FIG. 7.

Figure 5:
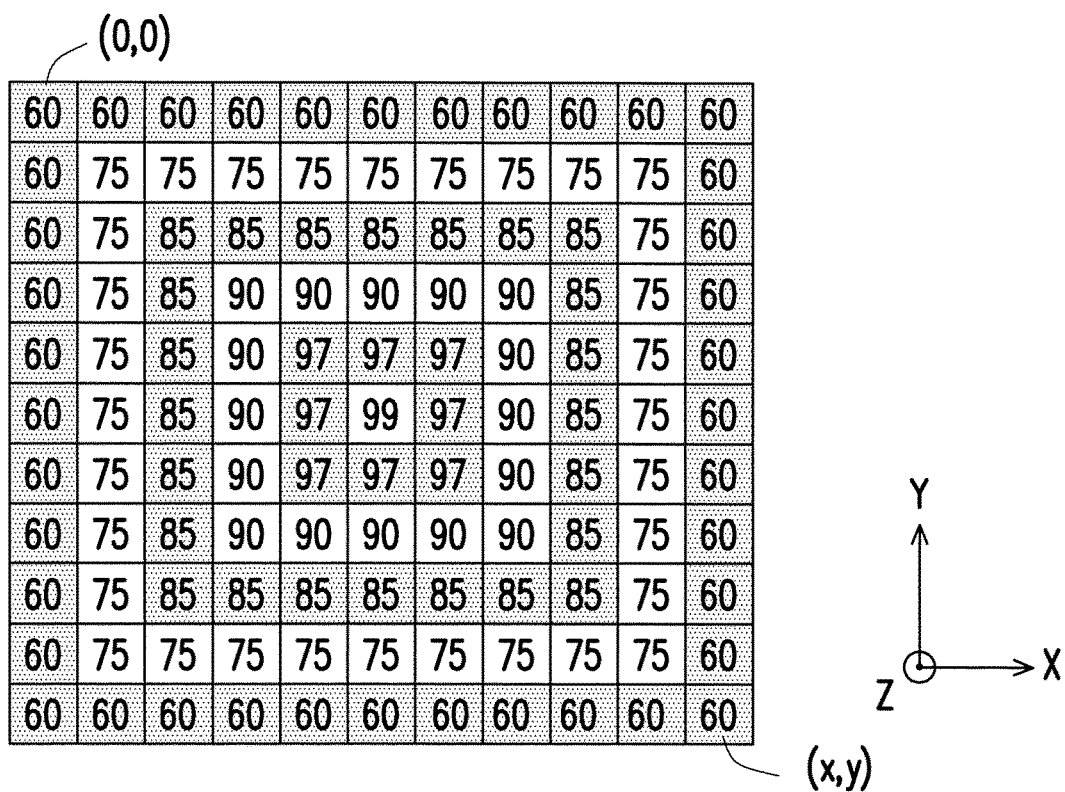
FIG. 5 is a schematic diagram of a slicing number matrix of the embodiment of FIG. 4.

FIG. 5 is a schematic diagram of a slicing number matrix of the embodiment of FIG. 4. In the present embodiment, the processing device 110 analyzes the outer 3D contour 410 of the 3D model casing 400 to obtain a plurality of slicing numbers corresponding to a plurality of coordinate positions of the outer 3D contour 410 on the reference plane S1. As shown by the slicing number matrix of FIG. 5, in the present embodiment, the slicing number matrix is, for example, an 11×11 matrix. The slicing number matrix may have a plurality of slicing number information respectively corresponding to coordinates (0,0) to coordinates (x,y). Moreover, the slicing number information of the slicing number matrix may respectively correspond to the slicing numbers of a plurality of highest point positions of the outer 3D contour 410 of the 3D model casing 400.

To be specific, in the present embodiment, the 3D model casing 400 is, for example, formed by stacking 99 layers of sliced images, so that the highest point position of the 3D model casing 400 is the thickness of 99 layers of the sliced object casings. Deduced by analogy, the highest point positions corresponding to other coordinate positions of the 3D model casing 400 may be respectively formed by stacking different numbers of the sliced object casings.

Figure 6:
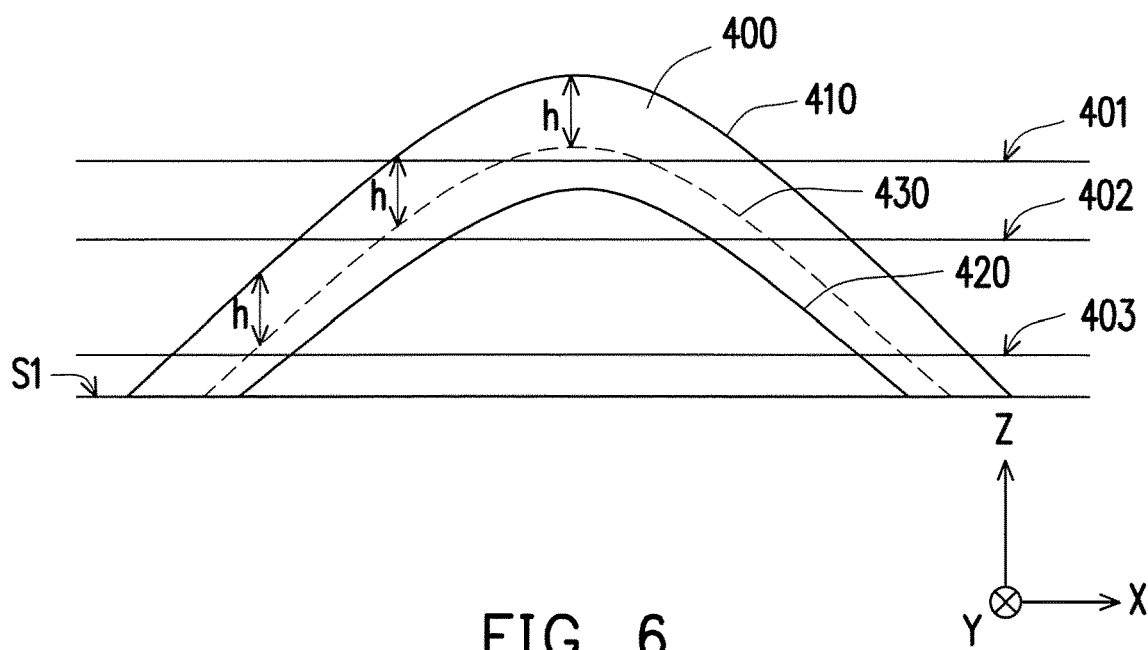
FIG. 6 is a side view of a 3D model according to the embodiment of FIG. 4.
Figure 7:
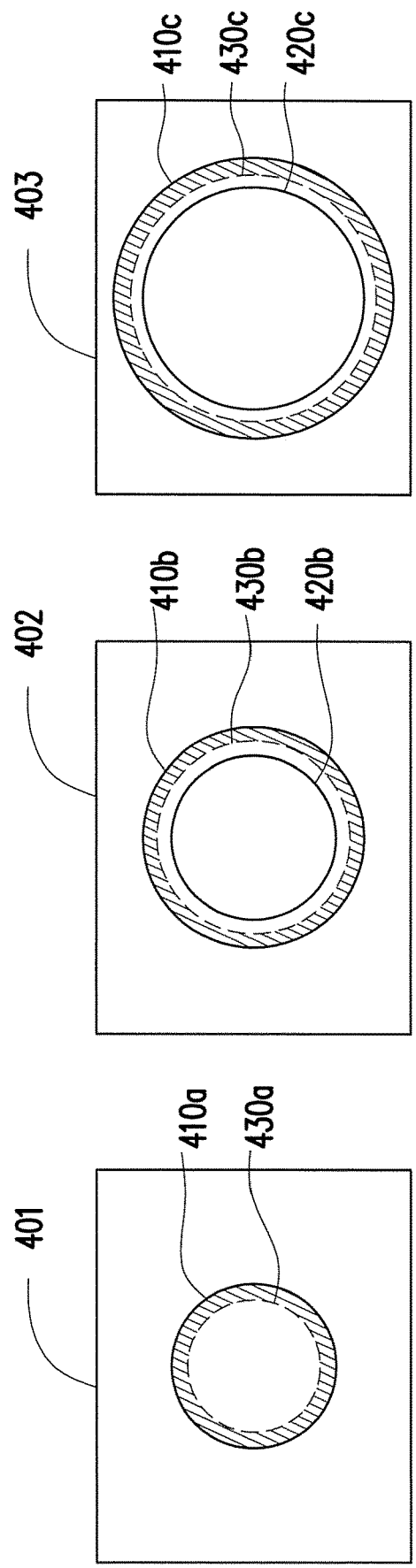
FIG. 7A-FIG. 7C are schematic diagrams of editing sliced images according to the embodiment of FIG. 4.

FIG. 6 is a side view of a 3D model according to the embodiment of FIG. 4. In the present embodiment, the processing device 110 may determine a distance of the 3D model casing 400 from the outer 3D contour 410 to the inner 3D contour 420 in the vertical direction based on a plurality of the slicing numbers corresponding to a plurality of the coordinate positions of the slicing number matrix shown in FIG. 5, and respectively modify a plurality of the sliced object casings of a plurality of the sliced images. Taking sliced images 401, 402, 403 as an example, the sliced images 401, 402, 403 are respectively located at different slicing positions of the 3D model casing 400. In the present embodiment, the processing device 110 determines a 3D reference contour 430 of the 3D model casing 400 according to a predetermined distance h, and the slicing number may be taken as a unit of the predetermined distance h. Namely, in order to make the 3D model casing 400 to have the same distance h in the vertical direction (the direction of the coordinate axis Z), the processing device 110 may set the 3D model casing between outer 3D contour 410 and the 3D reference contour 430 as a printing region, and set the 3D model casing between the 3D reference contour 430 and the inner 3D contour 420 as a non-printing region. Namely, the 3D printing device 120 does not perform the 3D printing operation to the 3D model casing between the 3D reference contour 430 and the inner 3D contour 420.

Referring to FIG. 7A-FIG. 7C for a detailed edit method of the sliced images, and FIG. 7A-FIG. 7C are schematic diagrams of editing the sliced images according to the embodiment of FIG. 4. Moreover, in the following embodiment, it is assumed that the predetermined distance h is a thickness of the stacked sliced objects of 5 layers of the sliced images, though the invention is not limited thereto.

In the present embodiment, the sliced image 401 of FIG. 7A is, for example, a sliced image of $88^{th}$ layer of the 3D model casing 400. In the present embodiment, a region (a slash line region) encircled by a contour 410a corresponding to the outer 3D contour 410 is the sliced object casing. The processing device 110 determines whether the region corresponding to each of the coordinate positions of the sliced object casing in the sliced image 401 is a printing region or a non-printing region. Namely, if a slicing number (88) corresponding to a part of the sliced object casing of the sliced image 401 at each of the coordinate positions of is not within a range from the slicing number of the corresponding highest point position in the slicing number matrix to the predetermined distance h, it is determined that this part of the sliced object casing is the non-printing region. For example, the slicing number of the highest point position of the 3D model casing 400 at the coordinate position (6,6) is 99, though the slicing number of the sliced object casing of the sliced image 401 at the coordinate position (6,6) is 88 (88<99–5). Therefore, the processing device 110 determines that the sliced object casing of the sliced image 401 at the coordinate position (6,6) is the non-printing region. Deduced by analogy, the sliced object casing of the sliced image 401 at coordinate positions (5,5), (6,5), (7,5), (5,6), (7,6), (5,7), (6,7), (7,7) are also the non-printing regions (88<97–5). Moreover, the other coordinate axis positions of the sliced object casing of the sliced image 401 with the slicing number smaller than 93 at the highest point positions are printing regions (for example, 88≥93–5). Therefore, as shown by the sliced image 401, the processing device 110 sets the region (the slash line region) encircled by the contour 410a to the contour 430a as the printing region, and sets the region (non-slash line region) encircled by the contour 430a as the non-printing region.

In the present embodiment, the sliced image 402 of FIG. 7B is, for example, a sliced image of $83^{rd}$ layer of the 3D model casing 400. In the present embodiment, a region (a slash line region) encircled by a contour 410b corresponding to the outer 3D contour 410 and a contour 420b corresponding to the inner 3D contour 420 is the sliced object casing. The processing device 110 determines whether the region corresponding to each of the coordinate positions of the sliced object casing in the sliced image 402 is a printing region or a non-printing region. Namely, if a slicing number (83) corresponding to a part of the sliced object casing of the sliced image 402 at each of the coordinate positions of is not within a range from the slicing number of the corresponding highest point position in the slicing number matrix to the predetermined distance h, it is determined that this part of the sliced object casing is the non-printing region. For example, the slicing number of the highest point position of the 3D model casing 400 at the coordinate positions (4,4), (5,4), (6,4), (7,4), (8,4), (4,5), (8,5), (4,6), (8,6), (4,7), (8,7), (4,8), (5,8), (6,8), (7,8), (8,8) is 90, though the slicing number of the sliced object casing of the sliced image 402 at these coordinate positions is 83 (83<90–5). Therefore, the processing device 110 determines that the sliced object casing of the sliced image 402 at these coordinate positions is the non-printing region. Deduced by analogy, the other coordinate axis positions of the sliced object casing of the sliced image 402 with the slicing number smaller than 88 at the highest point positions are printing regions (for example, 83≥88–5). Therefore, as shown by the sliced image 402, the processing device 110 sets the region (the slash line region) encircled by the contour 410b to the contour 430b as the printing region, and sets the region (non-slash line region) encircled by contour 430b to the contour 420b as the non-printing region.

In the present embodiment, the sliced image 403 of FIG. 7C is, for example, a sliced image of $72^{nd}$ layer of the 3D model casing 400. In the present embodiment, a region (a slash line region) encircled by a contour 410c corresponding to the outer 3D contour 410 and a contour 420c corresponding to the inner 3D contour 420 is the sliced object casing. The processing device 110 determines whether the region corresponding to each of the coordinate positions of the sliced object casing in the sliced image 403 is a printing region or a non-printing region. Namely, if a slicing number (72) corresponding to a part of the sliced object casing of the sliced image 403 at each of the coordinate positions of is not within a range from the slicing number of the corresponding highest point position in the slicing number matrix to the predetermined distance h, it is determined that this part of the sliced object casing is the non-printing region. For example, the slicing number of the highest point position of the 3D model casing 400 at the coordinate positions (3,3), (4,3), (5,3), (6,3), (7,3), (8,3), (9,3), (3,4), (9,4), (3,5), (9,5), (3,6), (9,6), (3,7), (9,7), (3,8), (9,8), (3,9), (4,9), (5,9), (6,9), (7,9), (8,9), (9,9) is 85, though the slicing number of the sliced object casing of the sliced image 403 at these coordinate positions is 72 (72<85–5). Therefore, the processing device 110 determines that the sliced object casing of the sliced image 403 at these coordinate positions is the non-printing region. Deduced by analogy, the other coordinate axis positions of the sliced object casing of the sliced image 403 with the slicing number smaller than 77 at the highest point positions are printing regions (for example, 72≥77–5). Therefore, as shown by the sliced image 403, the processing device 110 sets the region (the slash line region) encircled by the contour 410c to the contour 430c as the printing region, and sets the region (non-slash line region) encircled by contour 430c to the contour 420c as the non-printing region.

Therefore, referring to FIG. 6, according to the method for editing the 3D model casing of the aforementioned embodiment, the processing device 110 may perform the 3D printing operation to the printing region of the 3D model casing between the outer 3D contour 410 and the 3D reference contour 430, and does not perform the 3D printing operation to the non-printing region of the 3D model casing between the 3D reference contour 430 and the inner 3D contour 420.

Figure 8:
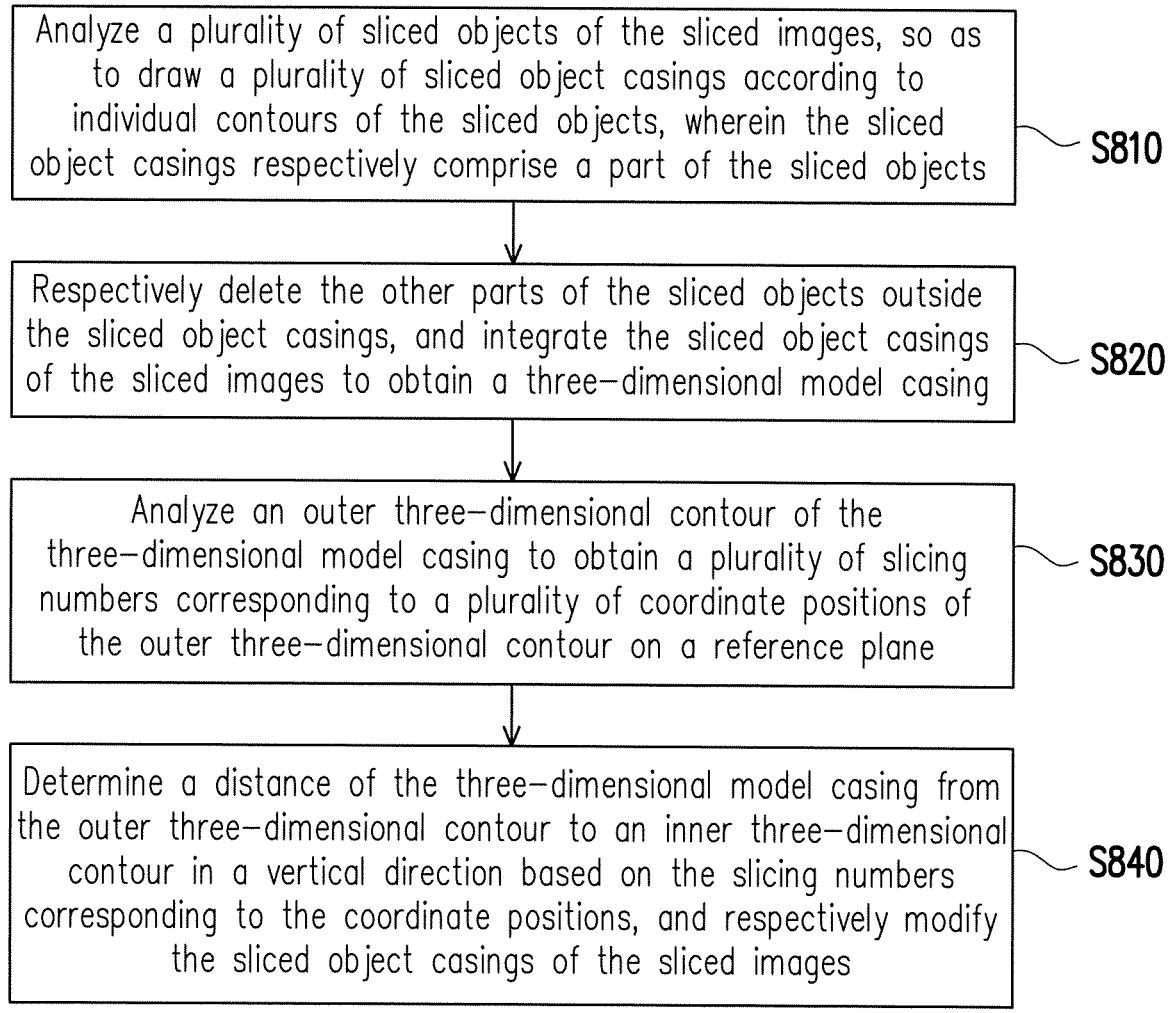
FIG. 8 is a flowchart illustrating a 3D printing method according to an embodiment of the invention.

FIG. 8 is a flowchart illustrating a 3D printing method according to an embodiment of the invention. Referring to FIG. 1 and FIG. 8, the 3D printing method of the present embodiment is at least adapted to the 3D printing apparatus 100 of FIG. 1. In step S810, the processing device 110 analyzes a plurality of sliced objects of a plurality of sliced images, so as to draw a plurality of sliced object casings according to individual contours of the sliced objects, where the sliced object casings respectively include a part of the sliced objects. In step S820, the processing device 110 respectively deletes the other parts of the sliced objects outside the sliced object casings, and integrates the sliced object casings of the sliced images to obtain a 3D model casing. In step S830, the processing device 110 analyzes an outer 3D contour of the 3D model casing to obtain a plurality of slicing numbers corresponding to a plurality of coordinate positions of the outer 3D contour on a reference plane. In step S840, the processing device 110 determines a distance of the 3D model casing from the outer 3D contour to an inner 3D contour in a vertical direction based on the slicing numbers corresponding to the coordinate positions, and respectively modifies the sliced object casings of the sliced images. Therefore, the 3D printing method of the present embodiment may obtain a smooth 3D model casing, and perform the printing operation on the edited 3D model casing, so as to print the 3D object with a high quality hollowing effect.

Moreover, enough instructions and recommendations for related sliced object analysis, edit method and related device features may be learned from the embodiments of FIG. 1-FIG. 7C, and detailed description thereof is not repeated.

In summary, the 3D printing apparatus and the 3D printing method of the invention are adapted to accurately modify the thickness of the 3D model casing in the horizontal direction and the vertical direction, and effectively mitigate unevenness of the inner 3D contour of the 3D model. Therefore, the 3D printing apparatus and the 3D printing method of the invention are adapted to obtain a smooth 3D model casing, and print a 3D object with a high quality hollowing effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional printing method, adapted to a three-dimensional printing apparatus, wherein the three-dimensional printing apparatus is configured to horizontally slice a three-dimensional model to obtain a plurality of sliced images, and edit the sliced images to execute a three-dimensional printing operation according to the edited sliced images, the three-dimensional printing method comprising:
analyzing a plurality of sliced objects of the sliced images, so as to draw a plurality of sliced object casings according to individual contours of the sliced objects, wherein each of the plurality of sliced object casings corresponds to corresponding one of individual contours of the sliced object casings, and the sliced object casings respectively comprise a part of the sliced objects;
respectively deleting the other parts of the sliced objects outside the sliced object casings, and integrating the sliced object casings of the sliced images to obtain a three-dimensional model casing,
wherein the step of analyzing the sliced objects of the sliced images, so as to draw the sliced object casings according to the individual contours of the sliced objects comprises:
respectively drawing a plurality of reference contours along an outer side of each of the individual contours of the sliced objects; and
respectively drawing the sliced object casings along an inner side of each of the reference contours.

2. The three-dimensional printing method as claimed in claim 1, wherein the sliced object casings respectively have a same predetermined thickness.

3. The three-dimensional printing method as claimed in claim 1, further comprising:
analyzing an outer three-dimensional contour of the three-dimensional model casing to obtain a plurality of slicing numbers corresponding to a plurality of coordinate positions of the outer three-dimensional contour on a reference plane; and
determining a distance of the three-dimensional model casing from the outer three-dimensional contour to an inner three-dimensional contour in a vertical direction based on the slicing numbers corresponding to the coordinate positions, and respectively modifying the sliced object casings of the sliced images.

4. The three-dimensional printing method as claimed in claim 3, wherein the step of determining the distance of the three-dimensional model casing from the outer three-dimensional contour to the inner three-dimensional contour in the vertical direction based on the slicing numbers corresponding to the coordinate positions comprises:
determining a printing region of the three-dimensional model casing according to a predetermined layer number, so as to modify the inner three-dimensional contour of the three-dimensional model casing.

5. The three-dimensional printing method as claimed in claim 1, wherein the contour is an outer layer contour or a hole contour.

6. The three-dimensional printing method as claimed in claim 1, further comprising:
respectively drawing a support structure in regions encircled by the sliced object casings.

7. A three-dimensional printing apparatus, comprising:
a three-dimensional printing device;
a processing device, coupled to the three-dimensional printing device, wherein the processing device is configured to horizontally slice a three-dimensional model to obtain a plurality of sliced images, and edit the sliced images, wherein the processing device operates the three-dimensional printing device to execute a three-dimensional printing operation according to the edited sliced images; and
a storage device, coupled to the processing device, and configured to store the three-dimensional model and a plurality of modules, wherein the processing device executes the modules to perform operations of:
analyzing a plurality of sliced objects of the sliced images, so as to draw a plurality of sliced object casings according to individual contours of the sliced objects, wherein each of the plurality of sliced object casings corresponds to corresponding one of individual contours of the sliced object casings, and the sliced object casings respectively comprise a part of the sliced objects; and
respectively deleting the other parts of the sliced objects outside the sliced object casings, and integrating the sliced object casings of the sliced images to obtain a three-dimensional model casing,
wherein the operation of analyzing the sliced objects of the sliced images, so as to draw the sliced object casings according to the individual contours of the sliced objects comprises:
respectively drawing a plurality of reference contours along an outer side of each of the individual contours of the sliced objects; and respectively drawing the sliced object casings along an inner side of each of the reference contours.

8. The three-dimensional printing apparatus as claimed in claim 7, wherein the sliced object casings respectively have a same predetermined thickness.

9. The three-dimensional printing apparatus as claimed in claim 7, wherein the processing device executes the modules to perform operations of:

analyzing an outer three-dimensional contour of the three-dimensional model casing to obtain a plurality of slicing numbers corresponding to a plurality of coordinate positions of the outer three-dimensional contour on a reference plane; and determining a distance of the three-dimensional model casing from the outer three-dimensional contour to an inner three-dimensional contour in a vertical direction based on the slicing numbers corresponding to the coordinate positions, and respectively modifying the sliced object casings of the sliced images.

10. The three-dimensional printing apparatus as claimed in claim 9, wherein the operation of determining the distance of the three-dimensional model casing from the outer three-dimensional contour to the inner three-dimensional contour in the vertical direction based on the slicing numbers corresponding to the coordinate positions comprises:

determining a printing region of the three-dimensional model casing according to a predetermined layer number, so as to modify the inner three-dimensional contour of the three-dimensional model casing.

11. The three-dimensional printing apparatus as claimed in claim 7, wherein the contour is an outer layer contour or a hole contour.

12. The three-dimensional printing apparatus as claimed in claim 7, wherein the processing device executes the modules to perform an operation of:

respectively drawing a support structure in regions encircled by the sliced object casings.

* * * * *